Figure 1:
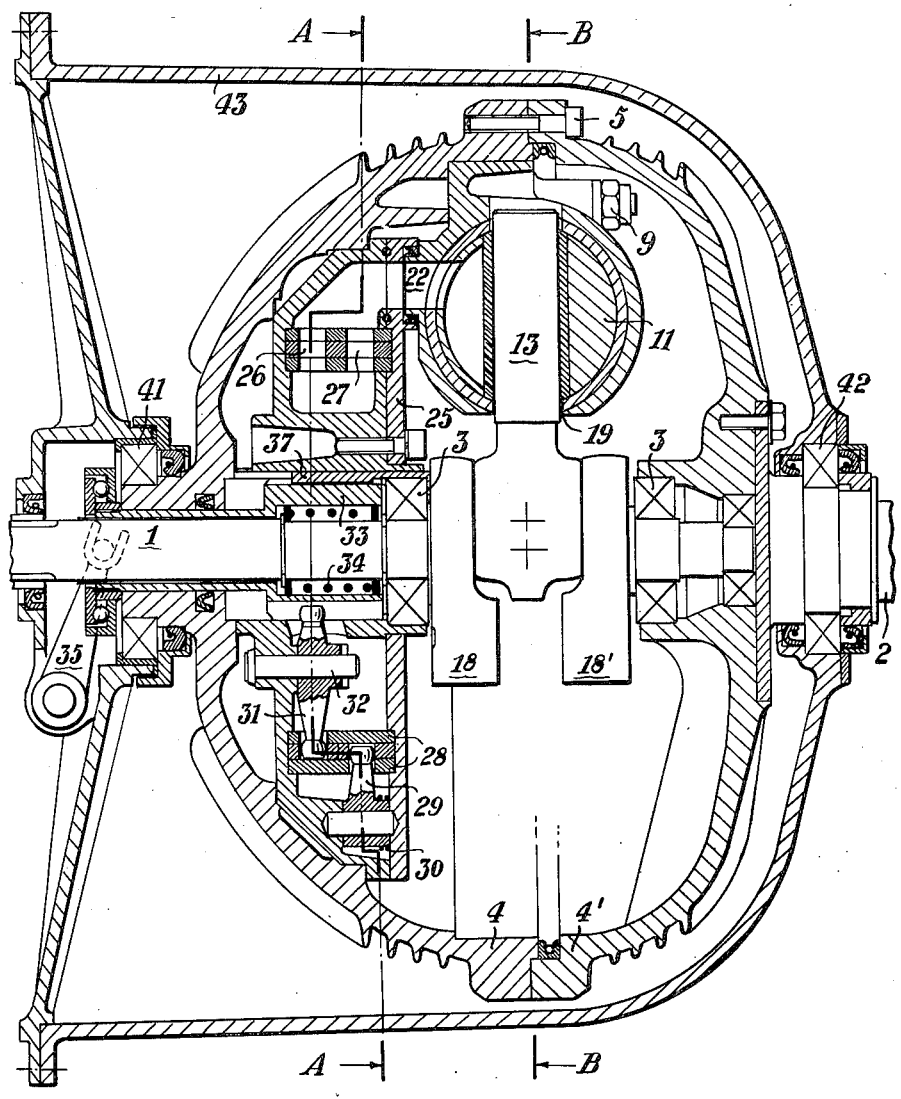

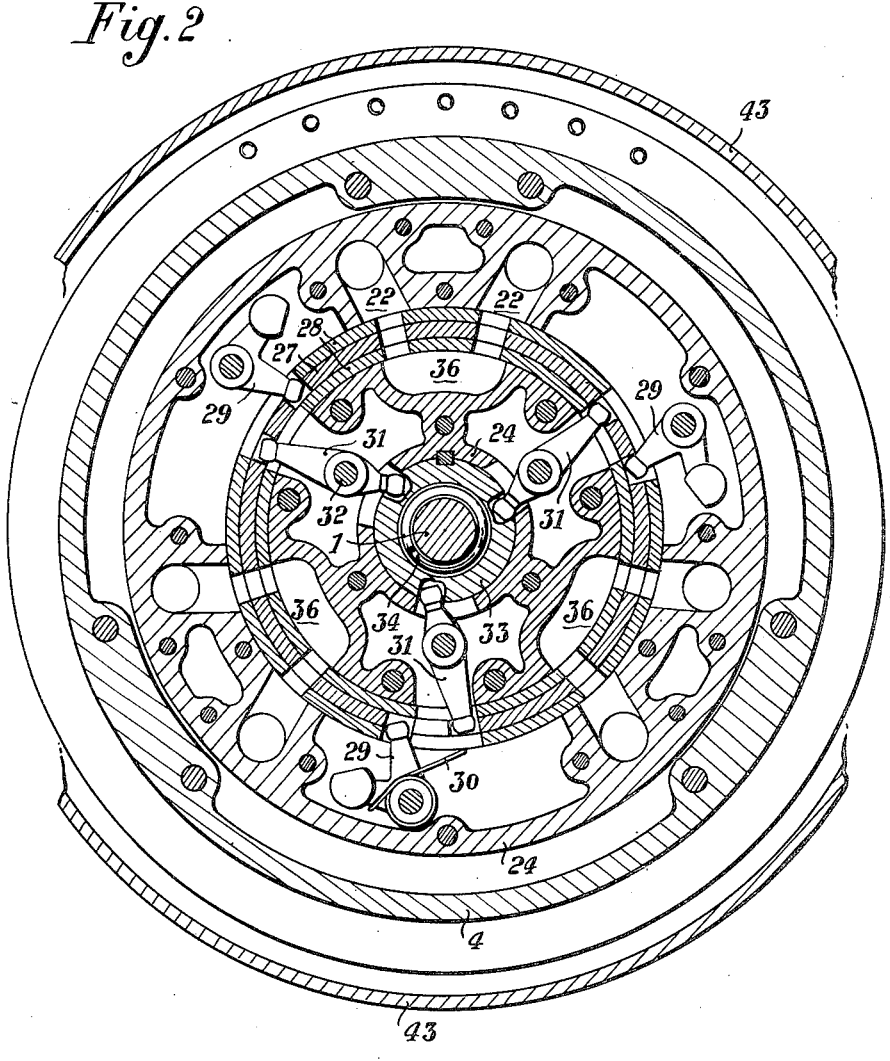

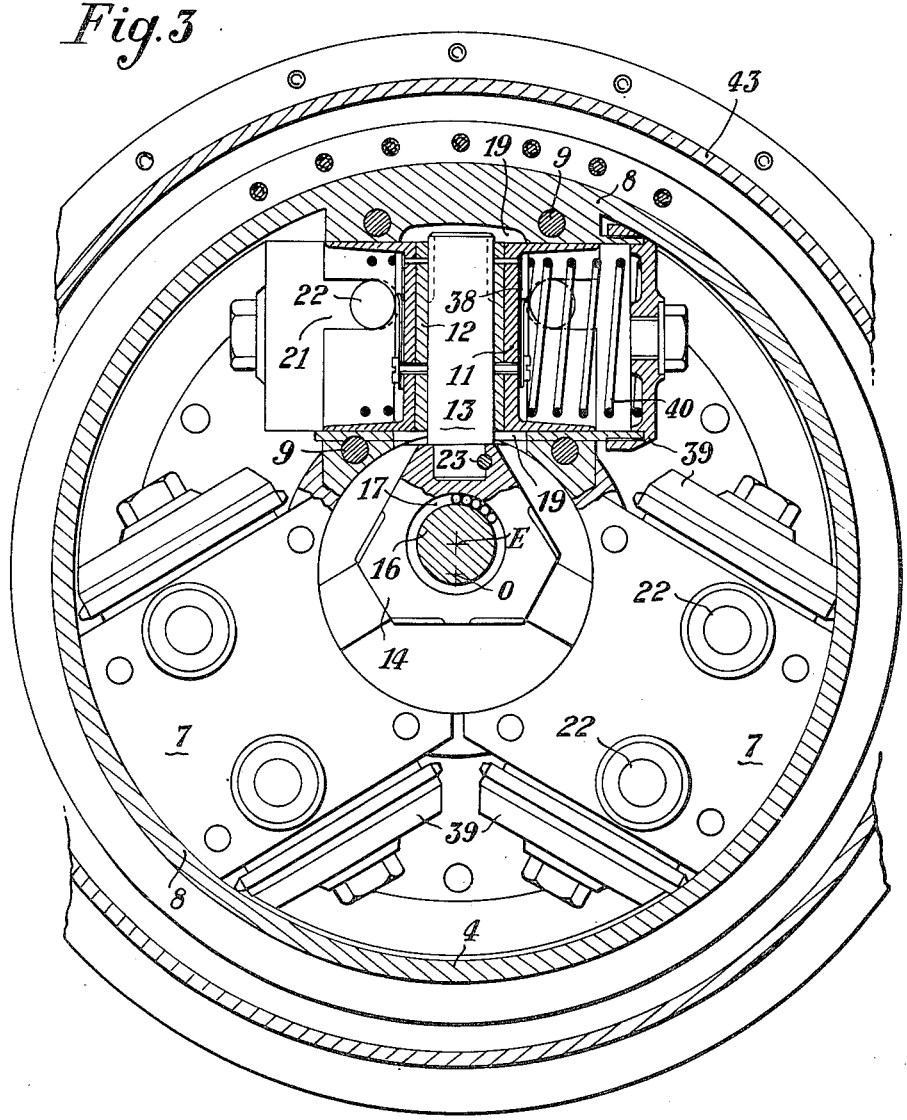

United States Patent Office 2,787,356
Patented Apr. 2, 1957

2,787,356

PROGRESSIVE HYDRAULIC TRANSMISSION

Luigi De Dionigi, Rome, Italy

Application September 22, 1953, Serial No. 381,630

8 Claims. (Cl. 192—60)

The present invention relates to a hydaulic transmission with progressively variable ratio, particularly suitable for use on motor vehicle and machine tools, the operation of which is based upon the resistance offered to the passage of a fluid by ports of progressively variable area.

The driving shaft and the driven shaft are coaxial, and when the unit operates in direct drive it acts as a simple 1:1 ratio fluid coupling.

The transmission consists substantially of a case connected to the driven shaft and revolving with it, and of a driver shaft carrying at its end a crank arm and eccentric journal upon which is pivotally mounted a spiderlike assembly of several arms, each of which, as the crank rotates, drives in reciprocating motion pistons sliding into a like number of cylinders mounted perpendicularly to the arms of the spider, and fitted into appropriate recesses of the housing.

The cylinders, and possibly also the housing, are filled with a fluid, which the reciprocating motion of the pistons drives alternatively from one to the other face of the pistons, until complete closing of the ports, whose area is progressively variable is achieved. Therefore, as long as the speed of the fluid in the ducts does not create sufficient resistance to check the free motion of the pistons, the housing will not be driven into motion, and the vehicle or driven member will remain still. This means that, in order to start the drive, a clutch is not necessary.

The ports and ducts are calibrated in such a way that the fluid can freely pass from one to the other face of the pistons till the speed of the driving shaft reaches a given value. Beyond this speed, the increased speed of the fluid creates a resistance to its passage, whereby the housing is brought into rotation, and with it the vehicle or driven member, with progressively increasing motion.

As the housing revolves, there enter into function a number of masses which, moving by centrifugal force against a calibrated resistance adjusted to fit the engine power curve, reduce the area of the ports till they are fully closed, thus locking the pistons and causing a direct drive between driving and driven shaft.

In addition to the normal flow ports automatically controlled by centrifugal force, as indicated above, each cylinder is fitted with a supplementary port adjusted by a hand-controlled valve, adjustable at will. This valve, by increasing the area of the ports, permits the engine to increase its R. P. M.'s and to reach maximum drive torque, i. e. to start the vehicle at maximum torque or to permit pickup at any speed with maximum torque.

Other features of the transmission in accordance with the present invention are more evident from the following detailed description, which makes reference to the enclosed drawings which represent, as a non-limiting example, one form of realisation of the invention.

In the drawings:

Fig. 1 is a longitudinal section of the transmission;
Fig. 2 is a section of the same through the plane A—A of Fig. 1;
Fig. 3 is a partial section through plane B—B of Fig. 1.

With reference to the figures, driving shaft 1 coaxial with driven shaft 2, can freely revolve in bearings 3 provided on the housing. The latter comprises two parts 4 and 4′ fastened together by bolts 5, between which are held cylinders 7; here shown as three in number, and the axes of which are positioned tangentially to a circumference centered on the axis O of the driving shaft.

Cylinders 7 are preferably machined from a single casting, which fits into circular recess 8 in the housing 4, to which it is fastened by means of stud bolts 9 and nuts.

In cylinders 7 slide pistons 11, diametrically bored, at the half-length point, by a hole fitted with bushing 12, into which passes journal 13, which is part of a spider 14, carrying three similar journals at 120° angles. This spider is pivoted freely, by means of a roller bearing 17, on eccentric journal 16, with center at E, fastened between two balance weights 18 and 18′, which are fastened in turn to the driving shaft. Journals 13 are mounted on spider 14 and fastened by means of locking pin 23.

In the condition described above, the three journals 13, as the driving shaft and journal 16 revolve, are entrained into a double motion, i. e. along their axis in bushing 12, and perpendicularly thereto, driving piston 11 into reciprocating motion. Two slots 19 are provided along the sides of cylinders 7 to permit this motion of journals 13.

The reciprocating motion of the pistons causes the fluid contained in the cylinders to pass from one to the other head thereof. To this end, two ports 21 are provided in the piston walls, aligned on the same generatrix and positioned opposite holes 22, which communicate with valve seat cover 25 and valve seat 24. The valves consist of rings 26 and 27, revolving freely between rings 28.

Ring 27 constitutes the automatic valves controlled by counterweight levers 29 which move against the pull of spring 30; while ring 26 constitutes the supplementary valves, which are controlled by levers 31 pivoted on pivot 32, which levers in turn are driven by lever 35, linked to the throttle control. Collar 33 is provided with helicoidal grooves to engage the ends of levers 31 and cannot rotate, but can only slide on valve seat 24, being restrained by key 37. Spring 34 pulls back the collar when the throttle action ceases.

The fluid, flowing out of the cylinder ports 22, passes through the ports of valves 26 or 27, runs through duct 36, and returns to the cylinder through the other port 22.

The pistons are also fitted with reed recovery valves 38. These reed valves 38 comprise a metal strip or reed resting on the inner face of each piston and fastened thereto by means of a screw (as seen in Fig. 3). The reed covers a hole in the piston through which fluid may pass, thus permitting flow of fluid in the event of piston blow-by. To decrease the pressure of the fluid, between pistons 11 and cylinder covers 39 fitted coil springs 40 are provided, which by absorbing shocks and limiting excessive pressures help in reducing the temperature of the fluid, to which end housing bells 4 and 4′ are also fitted with cooling fins.

The 4—4′ housing assembly rotates around the longitudinal axis of the drive, revolving in bearings 41 and 42, appropriately supported and connected to the engine by means of bell housing 43.

What is claimed is:

1. A progressive hydraulic transmission, particularly for motor vehicles and machine tools having driven shafts, said transmission comprising: a casing fastened to the driven shaft of the motor vehicle or machine tool;

a driving shaft coaxial with the said driven shaft and freely revolving in the said case; an eccentric journal pivot fastened to the said driving shaft; a cluster of radial pivots mounted upon said eccentric journal pivot; cylinders fastened tangentially in said case; conduits extending between opposite ends of each cylinder and having valved ports, pistons in said cylinders, said pistons fitted at mid-length with a radial sleeve engaging a pivot of the said pivot cluster causing, in combination with the motion of the said eccentric journal pivot, a reciprocating motion of said pistons.

2. A transmission as in claim 1, in which the said casing consists of two parts connected by bolts, and the said eccentric journal pivot is mounted between two balancing plates, being supported by brackets mounted on both sides of the case.

3. A transmission, as in claim 1, in which coil springs are fitted between the cylinder heads and the pistons.

4. A transmission, as in claim 1, in which, in addition to the said cylinders, the entire inner space in the case is filled with the same fluid contained in the cylinders, and the case is fitted with appropriate seals of a known type; a cylinder extending through a wall of said casing; and a piston in said cylinder spring biased toward the interior of said casing.

5. A transmission, as in claim 1, in which each piston is fitted, on each of the inner bottom faces, with a reed valve covering a hole passing through said faces.

6. A transmission as in claim 1 in which centrifugally actuated valves are provided in said valved ports.

7. A transmission as in claim 6, in which said valves comprise: two rotary valve rings and stationary concentric rings, said rotary valve rings being interposed between said stationary concentric rings.

8. A transmission as in claim 6 in which manually operated supplementary valves are provided in said ports.

References Cited in the file of this patent

UNITED STATES PATENTS

| | | |
|---|---|---|
| 1,517,343 | Coats | Dec. 2, 1924 |
| 2,025,472 | Perry | Dec. 24, 1935 |
| 2,400,121 | Kenyon | May 14, 1946 |
| 2,442,999 | Ekleberry | June 8, 1948 |

FOREIGN PATENTS

| | | |
|---|---|---|
| 434,106 | Great Britain | Nov. 24, 1933 |
| 486,727 | Great Britain | June 9, 1938 |